United States Patent [19]

Guay

[11] Patent Number: 4,613,277

[45] Date of Patent: Sep. 23, 1986

[54] ROBOTIC HEAD WITH INTERCHANGEABLE FINGERTIPS

[76] Inventor: Roger G. Guay, State Road 1163, Apex, N.C. 27502

[21] Appl. No.: 600,421

[22] Filed: Apr. 16, 1984

[51] Int. Cl.⁴ .............................................. B25J 15/04
[52] U.S. Cl. .................................. 414/729; 294/902; 901/31; 901/39
[58] Field of Search ....................... 901/50, 18, 29, 31, 901/39; 414/4, 729, 730; 294/DIG. 2, 28, 902

[56] References Cited

U.S. PATENT DOCUMENTS

| | | | |
|---|---|---|---|
| 4,042,122 | 8/1977 | Espy et al. ........................ | 414/4 X |
| 4,165,116 | 8/1979 | Baudoin et al. .................. | 901/39 X |
| 4,227,853 | 10/1980 | Woodford et al. ............... | 414/4 X |
| 4,512,709 | 4/1985 | Hennekes et al. ................ | 901/41 X |

OTHER PUBLICATIONS

Cummins et al, IBM Tech. Disc. Bull., vol. 24, No. 7a, Dec. 1981.

*Primary Examiner*—Terrance L. Siemens
*Attorney, Agent, or Firm*—Mills & Coats

[57] ABSTRACT

The present invention relates to a robotic head that includes a pair of fingers that are adapted to be moved back and forth in parallel relationship between closed and open positions. In addition there is provided a group of interchangeable fingertip sets, with each fingertip set being formed to retrieve and hold a certain size or shaped object. Each fingertip set can be automatically attached and detached from the fingers of the robotic head. In particular, at one single work station, the robotic head through appropriate programming can automatically interchange fingertip sets such that the same robotic head can retrieve and set various types and sizes of elements or parts at one single work station.

10 Claims, 4 Drawing Figures

ROBOTIC HEAD WITH INTERCHANGEABLE FINGERTIPS

FIELD OF INVENTION

The present invention relates to robotics and more particularly to robotic hands, and even more particular to finger actuating mechanisms and finger designs for robotic hands.

BACKGROUND OF INVENTION

Today, robotics are playing a very important role in industry. They are being used extensively in all phases of production and fabrication and their use is greatly increasing productivity and efficiency in American industry.

Typically, a robotic system will be found at a particular work station and will include a robotic head or hand secured to a robotic arm with the entire robotic system being selectively programmed. In use, the arm will move the robotic hand such that an element or object of a particular size and shape is retrieved by the hand and transferred to a setting point such as a particular location on a printed circuit board for example. Essentially, work pieces are conveyed to this work station and the robotic hand functions to transfer the same element, time after time, from a pickup point to a setting point where fabrication and assemblage takes place.

Generally, at such a work station, the single robotic hand only functions to transfer one particular element to the particular work piece. Therefore, for each element or part transferred to the work piece, one will find a separate work station and a separate robotic hand. This obviously is expensive in a situation where there are a great number of different types or sizes of elements or parts to be transferred. It is expensive because with this basic approach a different robotic system is required for each element.

In addition, many robotic systems include a robotic hand that includes a pair of fingers that are actuated in a scissor-like fashion. While this has been generally satisfactory, it is believed that greater efficiency and productivity can be gained with a robotic hand wherein the respective fingers of the hand would be actuated back and forth between opened and closed positions in such a manner that the fingers would always move in parallel relationship with each other.

SUMMARY AND OBJECTS OF THE INVENTION

The present invention presents a robotic system and more particularly a robotic head or hand that is designed to overcome some of the disadvantages and drawbacks associated with robotic heads of the prior art. In particular, the robotic head of the present invention is designed such that a single robotic head can retrieve and set a plurality or group of different sizes or types of elements or parts at one single work station. More particularly, the robotic system and robotic head of the present invention is provided with a group of interchangeable fingertip sets. Each fingertip set of the group is designed to retrieve and hold a particular type or size of element or part. In addition, the robotic system and robotic head of the present invention is designed such that the respective fingertip sets comprising the group of fingertip sets provided, can be easily and automatically interchanged by the robotic hand and system itself. Therefore, at a single work station, the robotic head of the present invention can be utilized to retrieve, transfer and set a plurality of different sizes or types of elements or parts. This can be accomplished by interchanging the fingertip sets between the setting of different elements or parts.

The present robotic system and robotic head further includes a tray that is designed to hold the group of fingertip sets therein. As disclosed herein, the holding tray is designed such that respective fingertip sets can be placed in the holding tray by simply positioning a respective fingertip set between opposed retaining walls forming a part of the holding tray and then rotating the fingertip set approximately 90° to where the fingertip set engages opposed side retaining structure of the holding tray which effectively engages and stabilizes the fingertip sets and holds the same in a stored or holding position. Likewise, the same fingertip sets can be retrieved from the holding tray by the robotic head. To accomplish this the robotic head engages the selected fingertip sets and rotates the same approximately 90° where the same becomes disengaged with respect to said opposed retainers. Upon disengagement, the selected fingertip sets can be easily and conveniently removed from the holding tray.

Also, the present robotic system and robotic head includes a finger actuator mechanism that is designed to move the depending fingers back and forth in parallel relationship. Generally, this finger actuator mechanism includes a cam engaging surface that is engaged by a cam structure which is in turn secured to a plunger actuator that moves up and down within the robotic head. The up and down movement of the plunger actuator causes the cam to move adjacent said cam engaging surface of the finger actuating mechanism. This related movement causes the depending fingers to be moved laterally back and forth between closed and open positions in parallel relationship.

It is therefore an object of the present invention to provide a robotic system and a single robotic head that has the capability of efficiently handling different types, sizes, shapes etc., of elements or parts at a single work station.

A further object of the present invention resides in the provision of a robotic system and robotic head that includes a group of interchangeable fingertip sets, with each fingertip set including a pair of fingertips particularly designed to retrieve and handle a certain type or size of element or part.

It is also an object of the present invention to provide a robotic system and robotic head of the character referred to above that is provided with means for enabling said respective fingertip sets to be automatically interchanged by the robotic system itself in an efficient and orderly manner.

It is also an object of the present invention to provide a robotic system and robotic head of the character referred to above with a holding tray that is specifically designed to accept and hold respective fingertip sets of the group provided Another object of the present invention resides in the provision of a method or process for robotically retrieving and transferring different size and shaped elements or parts at a single work station by a single robotic head.

In addition, another object of the present invention resides in the provision of a method for handling different types and sizes of elements or parts by a single robotic head entailing the provision of a group of fingertip sets with each set being specifically designed to retrieve and hold a certain type and size of element or part, and wherein the method or process entails actually interchanging respective fingertip sets about said robotic head such that the same robotic head can retrieve and handle a variety of elements or parts and wherein the variety of elements or parts can include elements or parts having different sizes and shapes etc.

Another object of the present invention resides in the provision of a robotic head having a pair of fingers depending therefrom wherein the robotic head is provided with a finger actuator mechanism that constrains the respective fingers to move in parallel relationship with each other as the fingers move between closed and opened positions.

Other objects and advantages of the present invention will become apparent from a study of the following description and the accompanying drawings which are merely illustrative of such invention.

DETAILED DESCRIPTION OF THE INVENTION

Figure 1:
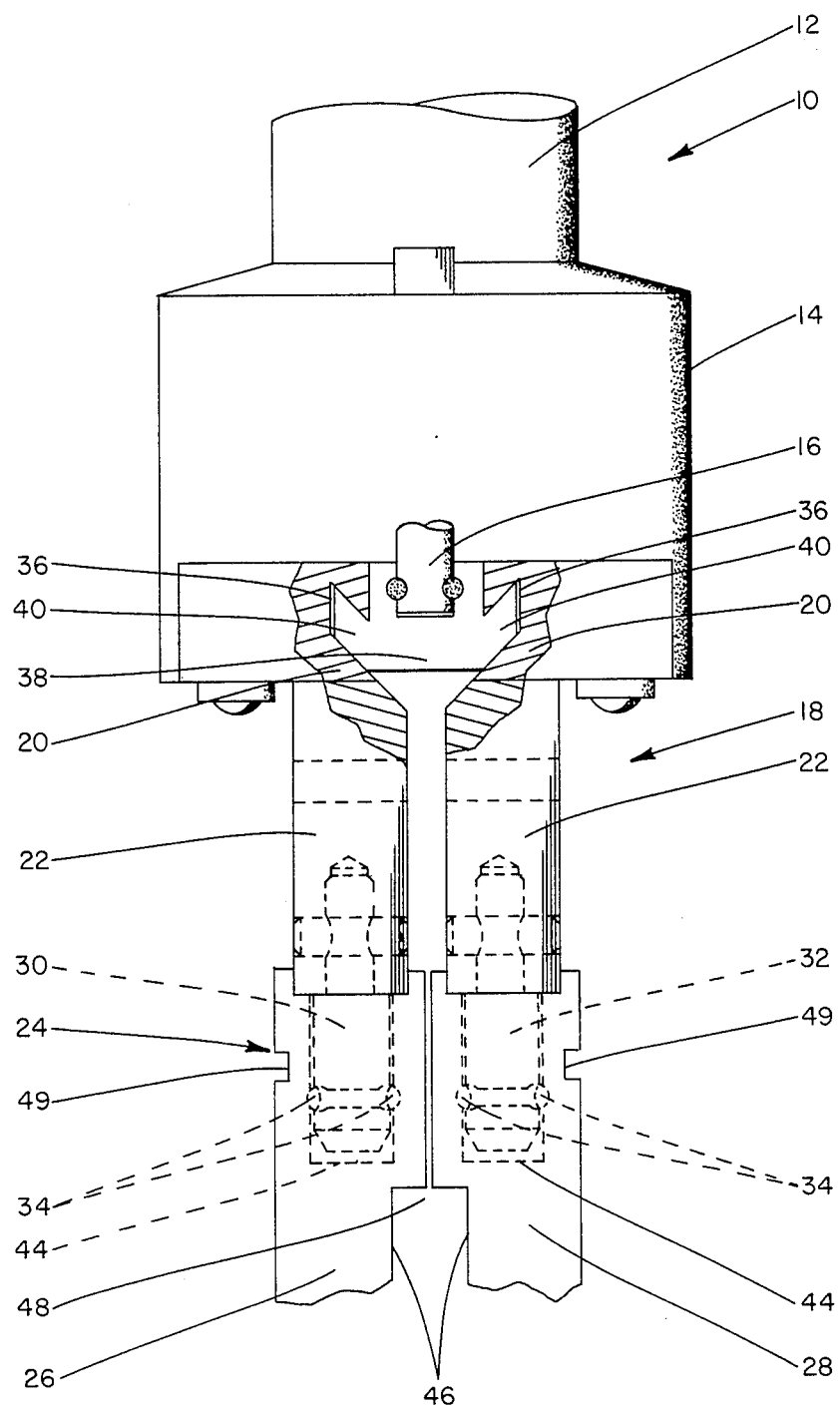
FIG. 1 is a side elevational view of the robotic system and robotic head of the present invention with portions broken away to illustrate the internal finger actuating mechanism and with the robotic head including a particular fingertip set secured thereto.

With further reference to the drawings, the robotic system and robotic head is shown therein. Robotic head, or robotic hand is referred to generally by the numeral 10.

It should be noted that the actuation and movement of robotic head or hand 10 is the same as found with conventional robotic heads or hands found in the prior art. For that reason, a detailed description of the robotic head 10 per se will not be dealt with herein. Suffice it to note that such robotic heads are generally pneumatically operated and include an air chamber and diaphragm arrangement that is operative to move a plunger actuator 16 up and down in a housing structure 12. Thus, it is appreciated that the robotic head 10 would be operatively associated with a system of air and the robotic head is typically programmed to selectively actuate plunger actuator 16.

It is further noted that robotic head 10 includes an upper support shaft 12 that is typically connected to an arm (not shown). Robotic head 10 and the arm form a part of the total robotic system that is programmed to retrieve and set elements or parts at a work station.

Details of the robotic system and head per se and particular its actuating mechanism are not dealt with herein in detail because they are not per se material to the present invention and further they are well known and appreciated in the art as such systems are presently commercially available.

The present invention essentially deals with the finger assembly and finger mechanisms depending from robotic head 10. In this regard, as shown in FIG. 1, the pair of finger assemblies 18 are operatively connected to robotic head 10 and depend downwardly therefrom. Each finger assembly includes a finger actuator 20 and a finger 22 depending downwardly from finger actuator 20.

A particular fingertip set, indicated generally by the numeral 24, is secured to fingers 22. Fingertip set 24 includes a pair of cooperating fingertips 26 and 28.

For connecting respective fingertip sets 24 to fingers 22, there is provided finger tip connectors or pins 30 and 32. Pins 30 and 32 are secured to the respective fingers 22 and extend downwardly therefrom. About the lower portion of each connecting pin 30 and 32, there is provided retaining means in the form of a series of spring loaded retaining balls 34. Retaining balls 34 are of the type that are spring loaded and which project outwardly from the surface of pins 30 and 32 so as to engage selected detents.

Referring back to the finger actuators 20, it is seen that the same are supported about the lower portion of robotic head 10 and are movable laterally back and forth therein. About the inboard side of each finger actuator 20 there is provided an irregular shaped cam engaging surface. In the present disclosure, the cam engaging surface formed about the inboard side of each finger actuator 20 includes an incline slot 36. It is appreciated that incline slot 36 extends at an angle to the longitudinal axis of plunger actuator 16.

Secured to plunger actuator 16 between finger actuators 20 is a cam 38. Cam 38 includes a pair of inclined cam inserts 40.

Inclined cam inserts 40 extend into the incline slots 36 formed about the inboard sides of finger actuators 20. It is appreciated that incline slots 36 and incline inserts 40 are so sized such that the cam inserts can be moved back and forth within incline slots 36.

Now attention is directed to the plurality of fingertip sets 24 and the respective fingertips 26 and 28 thereof. First, it should be emphasized that the present invention entails the provision of a group of fingertip sets, with each fingertip set being machined and/or dimensioned to retrieve and accept a certain size or shape of element or part. The particular manner of accomplishing this will be subsequently discussed herein.

As already noted, each fingertip set 24 includes a fingertip pair including a pair of fingertips 26 and 28. Each fingertip includes an upper cut-out 42, as particularly illustrated in FIG. 2. Formed in the top of each fingertip 26 or 28 is an opening 44 that extends downwardly into respective fingertips. Opening 44 is sized and dimensioned to particularly accept a connector pin 30 or 32. In addition, although not shown, each opening 44 includes detents formed therein for particular receiving the retaining balls 34 associated with each pin 30 or 32.

About the lower inside edge of each fingertip 26 and 28 there is provided a notched or cut-out portion 46. When a respective pair of fingertips 26 and 28 are positioned in appropriate side-by-side relationship, the respective cut-out portions 46 of each form an element or part fitting opening 48.

Each fingertip set 24 is formed to retrieve a certain size or shaped object. This is accomplished by particularly forming opening 48 a particular size and this is accomplished by cutting out a select portion of the lower inside portion of the respective fingertips 26 and 28 to form a certain size notch 46.

Further, each fingertip 26 or 28 is provided with an outside notch 49. As will be discussed subsequently herein, notch 49 is provided so as to cooperate with a tray holding structure to retain the respective fingertips 26 and 28 of the respective fingertip sets 24.

Figures 2, 3:
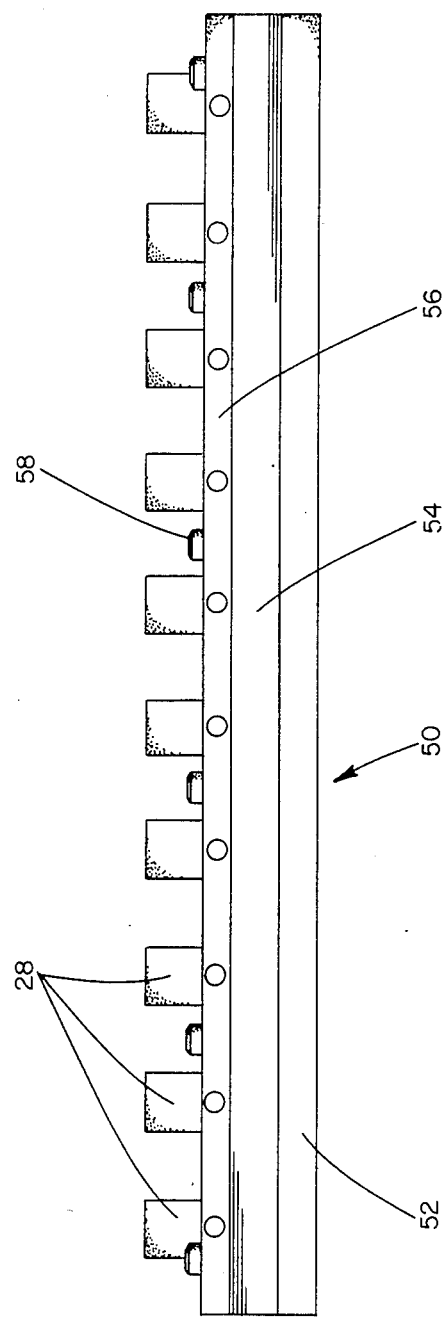
FIG. 2 is an end elevational view of the holding tray that is provided for holding a series of fingertip sets therein.
FIG. 3 is a side elevational view of the holding tray, particularly illustrating a series of fingertip sets held and supported therein in spaced apart relationship.

Turning to FIGS. 2 and 3 it is seen therein that the present invention includes a tray structure, indicated generally by the numeral 50. Tray structure 50 includes a bottom 52 and a pair of opposed side walls with each side wall including a lower side wall 54 and upper side bar or rail 56. Lower side wall 54 and side bar 56 on each side wall is secured together by a nut or bolt assembly 58.

It is seen that side bar 56 projects inwardly. Side bar 56 is of a vertical height that allows the same to extend through side notches 49 provided with each fingertip 26 and 28. Therefore, it is appreciated that the opposed side bars 56 act to support the respective fingertip sets while they are supported within tray structure 50.

In addition, at selected space locations along both side walls of tray 50, there is provided additional retaining means that extend from tray 50 into engagement with respective fingertip sets 24. This additional retaining means is in the form of a ball and spring plunger with the ball being designed to engage a detent formed within the side notch 49 of the respective fingertips 26 and 28. This is particularly illustrated in FIGS. 2, 3 and 4 of the drawings.

Therefore, in operation, the respective fingertips 26 and 28 of any fingertip set 24 are designed to be moved between a closed position and an open position. In a closed position, the inside edges of respective fingertips 26 and 28 abut and opening 48 is of a particular size so as to receive and hold a certain part or element to be retrieved, transferred and set. Further, by actuating robotic head or hand by causing plunger actuator 16 to move downwardly, results in fingers 22 being spread and accordingly results in the respectively connecting fingertips 26 and 28 being moved to an open position. In an open position, the part or element being carried within opening 48 is released and set.

In order for the robotic head or hand 10 to set a different type, size or shape part or element, then the fingertip set 24 must be interchanged. To accomplish this, the robotic system is programmed such that the robotic head moves to an area where tray 50 is located.

Figure 4:
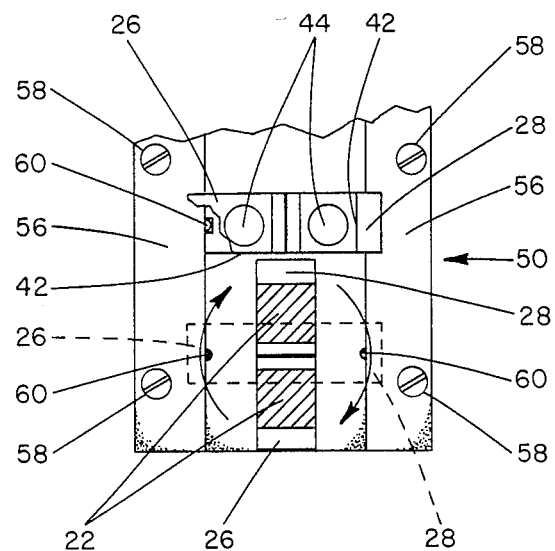
FIG. 4 is a fragmentary top plan view of the holding tray for the fingertip sets with the upper shown fingertip set being transversely positioned and held within the tray and with a portion broken away to illustrate a detent and spring loaded retaining ball, and wherein about the lower portion of the tray the fingers of the head are shown in section with attached fingertips being positioned longitudinally within the tray prior to rotation and prior to being locked within the tray.

The robotic head then moves down and places the respective fingertips 26 and 28 in a certain area of the tray 50 such that they lie generally midway between the side walls of tray 50 and with the fingertips extending generally parallel to the side walls, as illustrated in section in FIG. 4. Once the robotic hand has the fingertips in that position, the robotic head is then rotated in conventional fashion. By rotating robotic head 10 the pair of fingertips 26 and 28 are rotated approximately 90° to a transverse position as shown in dotted lines in FIG. 4. It is seen that in the process of rotating the fingertips 26 and 28 to the transverse position, that the respective fingertips 26 and 28 engage side bars 56. Expressed in another way, this rotation results in the side bars 56 being effectively inserted through the side notches 49. In addition, in the transverse stationed position, as illustrated in FIG. 2, the adjacent ball retainers 60 project into the detents formed in the side notches 49.

Once the pair of fingertips 26 and 28 are appropriately positioned within tray 50, then the robotic head is lifted upwardly and this upward movement results in the connecting pins 30 and 32 disengaging the respective fingertips 26 and 28.

After this, robotic head 10 is moved through programming to a position where connecting pins 30 and 32 align with the respective fingers 26 and 28 of the particular fingertip sets 24 that is to now be connected. Once alignment is achieved, robotic head is moved downwardly to where the connector pin 30 and 32 are inserted into openings 44 of the new fingertip sets 24. Once the connection is made, the robotic hand or head 12 is rotated so as to disengage the fingertips now secured to the connector pins 30 and 32 from bars 56 of tray 50.

The above interchanging process is continued time after time so as to retrieve and handle various types, sizes and shapes of objects.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claim are intended to be embraced therein.

What is claimed is:

1. A robotic head having interchangeable fingertips for enabling the same robotic head to retrieve and set various types and sizes of elements or parts at one fabricating station and comprising: a robotic head; finger means extending from said robotic head including a plurality of fingers movable back and forth between open and closed position; said finger means including interchangeable fingertip means extending from said fingers for retrieving different size objects, and wherein said fingertip means includes a plurality of fingertip sets with each fingertip set including a pair of fingertips provided with means for retrieving a different size object; said finger means including connecting means for attaching and detaching said respective fingertip sets to and from said finger means; and a fingertip tray including a fingertip retaining side wall structure for receiving and holding a plurality of fingertip sets.

2. The robotic head having interchangeable fingertips associated therewith of claim 1 wherein said tray means includes an elongated open area for receiving and holding respective fingertip sets in longitudinal spaced apart relationship.

3. The robotic head having interchangeable fingertips associated therewith of claim 2 wherein each fingertip set includes a pair of fingertips normally held by said robotic head or said tray in side-by-side relationship and wherein each fingertip includes an outer edge; and wherein said tray includes a pair of laterally spaced side walls with each side wall including a rail projecting inwardly therefrom; and wherein each fingertip about the outer edge thereof includes a rail notch for receiving a respective rail therein when secured within said tray; and wherein said side walls, rails, fingertips and said rail notches within said fingertips are so sized and dimensioned such that said fingertips can be placed and snuggly held within said tray by inserting a respective pair of fingertips between said side walls such that the fingertips extend generally parallel with said side walls and then rotating the fingertips to where they extend transversely between said side walls and wherein said rail extends through said rail notches formed within said respective fingertips; and wherein said respective fingertips can be removed from said tray by rotating a respective pair of fingertips from said transverse position within said tray to a position where said rails have cleared said rail notches formed within the pair of fingertips.

4. The robotic head including said interchangeable fingertips associated therewith of claim 3 wherein said side walls of said tray includes longitudinally spaced apart plunger means that project outwardly therefrom for engaging respetive fingertips positioned within said tray, and wherein respective fingertips include detent means for receiving said plunger means wherein when said plunger means projects into engagement with said detent means, said respective fingertips are held and stablized within said tray.

5. The robotic head having said interchangeable fingertips associated therewith, of claim 1, wherein said connecting means includes pin means projecting from said fingers and wherein respective fingertips include an opening in a top portion thereof for receiving said connecting means, and said pin means includes means for connecting the same to respective fingertips as said pin means projects into said opening within the top of said respective fingertips.

6. The robotic head having interchangeable fingertips associated therewith, of claim 5, wherein there is provided detent means with the opening formed in the top of respective fingertips for receiving said pin connecting means, and wherein said pin connecting means include plunger and ball means projecting therefrom wherein when said pin connecting means is inserted within the openings formed within the top of respective fingertips, said plunger and ball means is operative to project into and engage with said detent means for securely coupling respective fingertips to said pin connecting means.

7. A robotic head having interchangeable fingertips and wherein there is provided a plurality of fingertip sets, each fingertip set adapted to retrieve and set a certain size or shaped object, said robotic head comprising:

A. a robotic head;
B. said robotic head including finger means projecting downwardly therefrom and wherein said finger means includes a pair of fingers that are movably mounted for back and forth movement between inner and outer positions;
C. fingertip connecting means projecting downwardly from said fingers and including a pair of laterally spaced pins with each pin connected to and extending from a respective finger;
D. interchangeable fingertip means adapted to be connected to said fingers via said pins;
E. said interchangeable fingertip means including a plurality of fingertip sets with each fingertip set including a pair of cooperating fingertips for retrieving and setting a certain size or shape object;
F. each pair of cooperating fingertips including an opening formed about the top thereof for receiving a pin of said fingertip connecting means;
G. said pins extending from said fingers including coupling means for attaching the same to respective fingertips in response to said pins being inserted into said openings of said respective fingertips; and
H. tray means for receiving and holding respective fingertip sets in spaced apart relationship, said tray means including two laterally spaced apart side walls with each side wall including means for engaging respective fingertips held within the tray means with the respective fingertips of each set being held in side-by-side relationship within said tray means.

8. The robotic head and interchangeable fingertips associated therewith of claim 7 wherein each respective fingertip includes an outer edge that is provided with a notch formed therein and detent means; and wherein each of the side walls of said tray means includes a rail that extends longitudinally along a respective side wall and which projects inwardly therefrom and wherein each rail is adapted to extend through the notch of an adjacent fingertip when said fingertips are held within said tray means; and wherein each side wall further includes a series of spaced apart wall and plunger means that project inwardly therefrom for selected engagement with said detent means on respective fongertips for providing additional stablity to the respective fingertips supported within said tray means.

9. A robotic head having interchangeable fingertips for enabling the same robotic head to retrieve and set various types and sizes of elements or parts at one fabricating station comprising: a robotic head; finger means extending from said robotic head including a plurality of finger moveable back and forth between open and closed positions; said finger means including interchangeable fingertips means extending from said fingers for retrieving different size objects, and wherein said fingertip means includes a plurality of fingertip sets with each fingertip set including a pair of fingertips provided with means for retrieving a different size or shaped object; and wherein said finger means includes connecting means for attaching and detaching said respective fingertip sets to and from said finger means; a finger tray including a fingertip retaining side wall structure for receiving and holding a plurality of fingertip sets in a longitudinal spaced apart relationship, said fingertip tray including a pair of laterally spaced side walls with each side wall including a rail projecting inwardly therefrom; and wherein each fingertip about the outer edge thereof includes a rail notch for receiving a respective rail therein when secured within said fingertip tray; and wherein said side walls, rails, fingertips, and said rail notches within said fingertips are so sized and dimensioned such that said fingertips can be placed and snuggly held within said fingertip tray by inserting a respective pair of fingertips between said side walls such that the fingertips extend generally parallel with said side walls and then rotating the fingertips to where they extend transversely between said side walls and wherein said rail extends through said rail notches formed within said respective fingertips; and wherein said respective fingertips can be removed from said fingertip tray by rotating a respective pair of fingertips from said transverse position within said tray to a position where said rails have cleared said rail notches formed within the pair of fingertips.

10. The robotic head including interchangeable fingertips associated therewith of claim 9 wherein said side walls of said fingertip tray includes longitudinally spaced apart plunger means that project outwardly therefrom for engaging respective fingertips position within said fingertip tray, and wherein respective fingertips include detent means for receiving said pluger means wherein said plunger means projects into engagement with said detent means, such that respective fingertips are held and stabilized within said fingertip tray.

* * * * *